March 19, 1929.  J. PETER  1,706,320
SIFTING MEANS
Filed Dec. 27, 1924  2 Sheets-Sheet 1

Inventor
Jakob Peter
by James L. Norris
Attorney

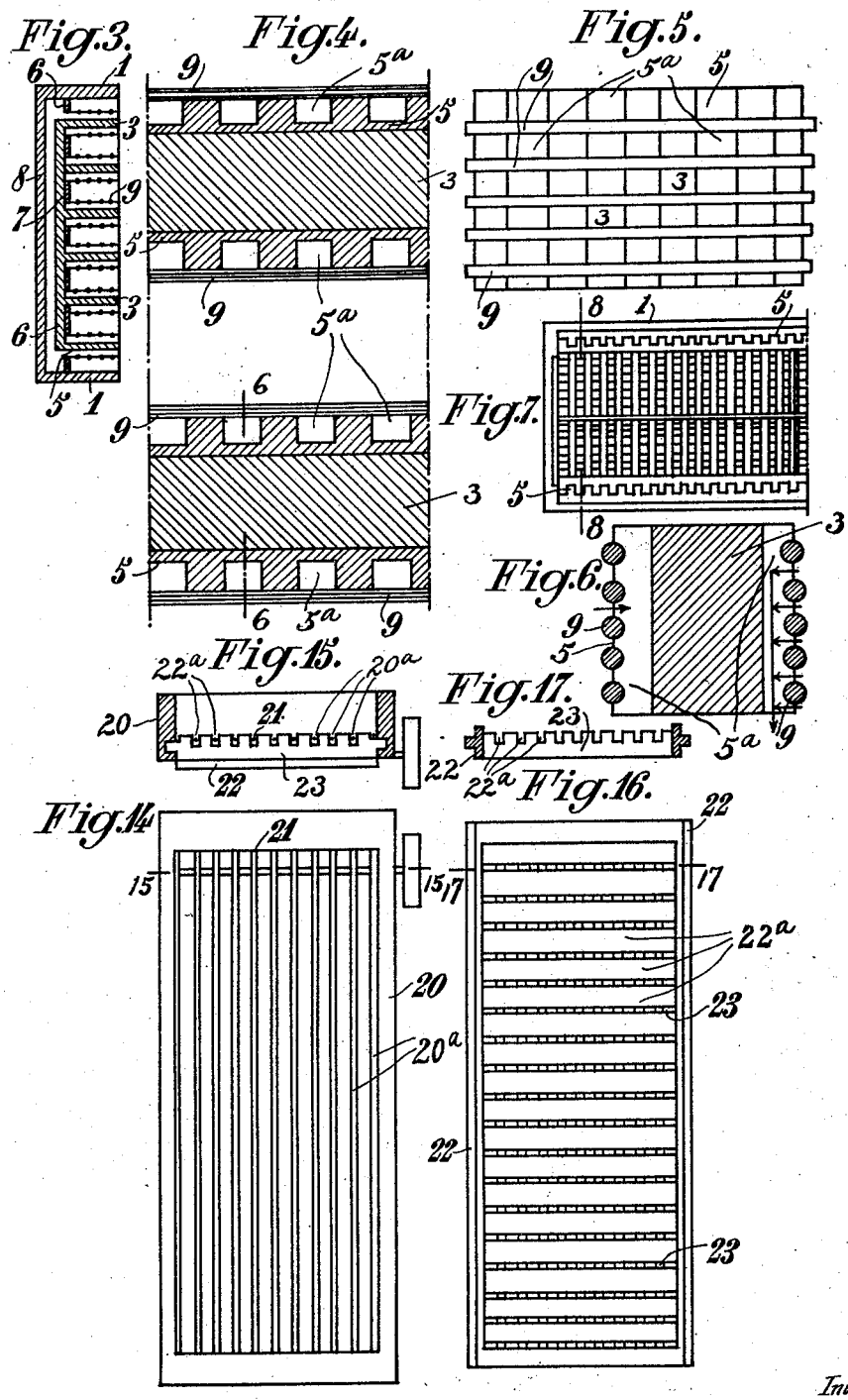

Patented Mar. 19, 1929.

1,706,320

UNITED STATES PATENT OFFICE.

JAKOB PETER, OF BADEN, SWITZERLAND.

SIFTING MEANS.

Application filed December 27, 1924, Serial No. 758,449, and in Switzerland January 16, 1924.

This invention relates to sieves generally, for example for use in machines for separating the seeds of weeds from grain or for sorting ground material.

The principal object of the invention is to provide a sieve wherein the mesh openings for the passage of the material to be sifted or sorted are formed by crossed grid parts, one of which is movable relatively to the other in order, not only to effect the sifting or sorting but also to effect the automatic cleaning of the mesh openings and thus prevent clogging of the latter.

Another important object of the invention is to provide a sifting means wherein the mesh openings are limited in depth in order that material may be sifted or sorted according to three dimensions, instead of according to two dimensions as heretofore.

The invention will be described with reference to the accompanying drawings, in which:

Fig. 4 is an enlarged detail transverse section taken through adjacent intermediate partitions;

Fig. 5 is a fragmentary side view looking toward one of the intermediate partitions;

Fig. 6 is a vertical section on the line 6—6 of Fig. 4;

Fig. 7 is a plan view of a modified form of sieve;

Fig. 14 is a plan view of a further modified form of sieve;

Fig. 15 is a vertical section on the line 15—15 of Fig. 14;

Fig. 16 is a plan view of the lower movable frame of the sieve shown in Figs. 14 and 15; and Fig. 17 is a vertical section on the line 17—17 of Fig. 16.

Figure 1:
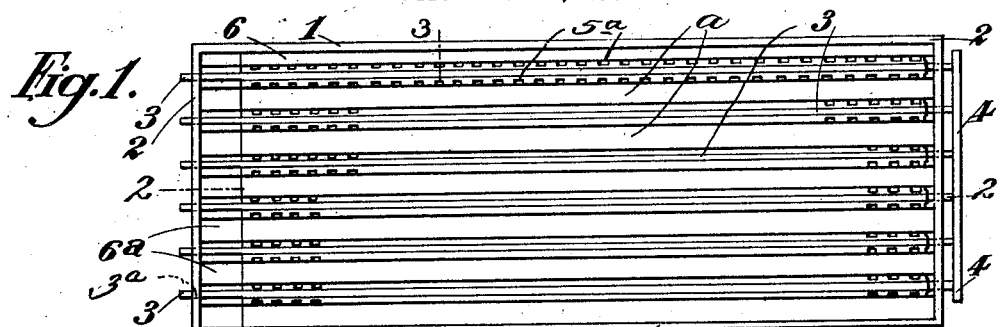
Fig. 1 is a top plan view of one embodiment of the invention.

Referring first to the form of sieve shown in Figs. 1 to 6 of the drawings, a rectangular frame is formed by side walls 1 and end walls 2. Said frame is divided into separate longitudinally extending spaces or channels $a$ by partitions 3, and plates 5 having vertical grooves $5^a$ are secured to the opposite sides of said partitions.

Imperforate stationary bottoms 6 (Figs. 2 and 3) are arranged in the longitudinal spaces $a$ adjacent the lower edges of the latter and serve as supports for the material to be sifted. The width of each of the bottoms 6 is approximately the same as the distance between opposed plates 5 and between the outermost plates 5 and the side walls 1 of the frame.

The grooved plates 5 extend between the bottoms 6 to approximately the lower sides of the latter so that the sifted material passing into the grooves $5^a$ passes through said grooves to a suitable receiving means, such as another bottom or chute (not shown). Material which is too coarse to enter the grooves $5^a$ is caused by the oscillation of the partitions 3 to pass to the lefthand end of the apparatus (Figs. 1 and 2) and to drop through apertures $6^a$ between said ends of the bottoms 6 and the adjacent end wall 2 of the frame, the bottoms 6 being shorter than the length of the frame.

Figure 3:
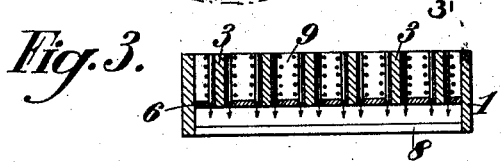
Fig. 3 is a section on the line 3—3 of Figs. 1 and 2.

A vertical series of grid wires 9, spaced a suitable distance apart, lies in close proximity to each of the faces of the plates 5, as shown in Figs. 3 and 4, or are partially embedded in longitudinal grooves in said faces, as shown in Fig. 6, and these wires have their opposite ends secured to the end walls 2 of the frame. These wires 9, together with the grooves $5^a$ of the plates 5, form meshes or openings for sifting the material, and such material, after passing between the wires into the grooves $5^a$, drops through the lower ends of the latter. The depth of the grooves $5^a$ determines one dimension of the particles of material which may pass through the sieve, so that any narrow particles which may pass between the wires 9 but which are longer than the depth of the grooves $5^a$ are prevented from passing through the sieve.

The arrows (Fig. 6) indicate the paths followed by the sifted or sorted material.

Thus the apparatus, as just described, effects what may be termed the "cubic separation" of the smaller from the larger particles of the material treated therein, that is to say, the distance between the wires 9 and the depth of the grooves 5ª determine the size of the particles which may pass through the grooves 5ª.

Figure 2:
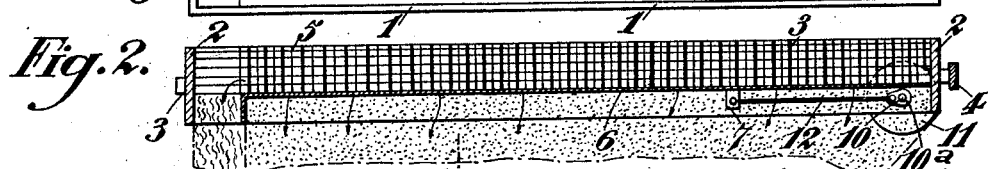
Fig. 2 is a vertical section of the sieve shown in Fig. 1 on the line 2—2 of Fig. 1.

The partitions 3 and the plates 5 carried thereby are longitudinally movable in slots 3ª in the end walls 2 of the frame, and the partitions are held together by a transverse cross-head 4 (Figs. 1 and 2). A shaft 10 is journalled in the side walls of the frame and carries a crank 10ª which is connected by a pitman 12 to a cross-head 7 secured to the partitions 3. Thus when the shaft 10 revolves the partitions 3 are reciprocated relatively to the wires 9. The shaft 10 may be rotated in any suitable manner. The reciprocation of the partitions 3 and the plates 5 carried thereby not only effects the sifting of the material but also prevents clogging of the material between the wires 9.

Figure 8:
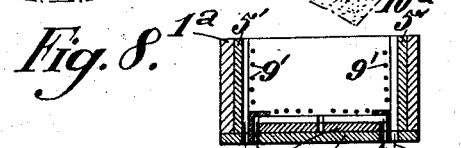
Fig. 8 is a vertical section on the line 8—8 of Fig. 7.
Figure 10:
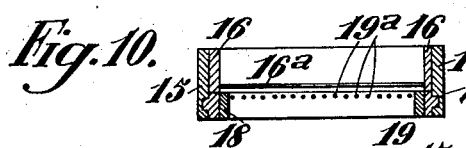
Fig. 10 is a vertical section on the line 10—10 of Fig. 9.
Figures 11, 12:
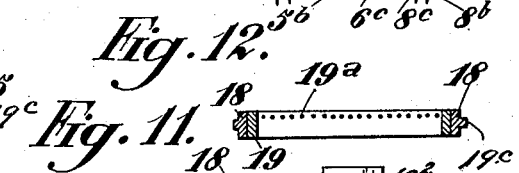
Fig. 11 is a plan view of the lower movable frame of the sieve shown in Figs. 9 and 10.
Fig. 12 is a vertical section on the line 12—12 of Fig. 11.

Figs. 7 and 8 show the sifting device just described in a plansifter. A bottom 6ᶜ extends across the lower end of the frame and has openings or passages 8ᵇ extending therethrough for the escape of material from vertical grooves formed in plates 5′ secured to the side walls. In addition, plates 5ᵇ are arranged to reciprocate longitudinally of the bottom 6ᶜ. The plates 5′ are caused to reciprocate longitudinally of the side walls by any suitable means, for example by means of a crank and pitman such as shown in Fig. 2, and the plates 5ᵃ may be caused to reciprocate longitudinally of the bottom in the same manner. The wires 9′ (shown in Fig. 8 but omitted from Fig. 7 for the sake of clearness) have their opposite ends secured to the end walls of the frame.

The plates 5′, which together with the wires 9′ serve to sift the material, preferably move in response to inertia.

The material which passes between the wires 9′ into the grooves of the plates 5ᵇ on the bottom of the frame passes out of the apparatus through passages 8ᶜ in the bottom, and the arrows in Fig. 8 indicate the path taken by the material as it passes through the openings 8ᵇ and 8ᶜ.

According to the embodiment of the invention shown in Figs. 9 to 13, the sifting frame is formed by walls 15 and 17. Stationary sieves, comprising sections 16, rigidly connected together, are disposed in the sifting frame and carry wires 16ª adjacent the bottom, which wires run parallel with the end walls 17 of the frame. Beneath the stationary sieves and surrounded by the frame 15, 17 is a longitudinally movable sifting frame 18, shown in detail in Figs. 11 and 12. This frame 18 is provided with longitudinal tongues 19ᶜ which work in longitudinal grooves formed in the side walls of the frame 15, 17, so that the frame 18, which is formed of a plurality of sections 19, is slidable relatively to the frame 15, 17. Each of the sections 19 of the frame 18 carries a plurality of spaced wires 19ª which run parallel with the side walls of the frame 15, 17. The wires 19ª may be spaced the same distance apart as the wires 16ª or otherwise.

Figures 9, 13:
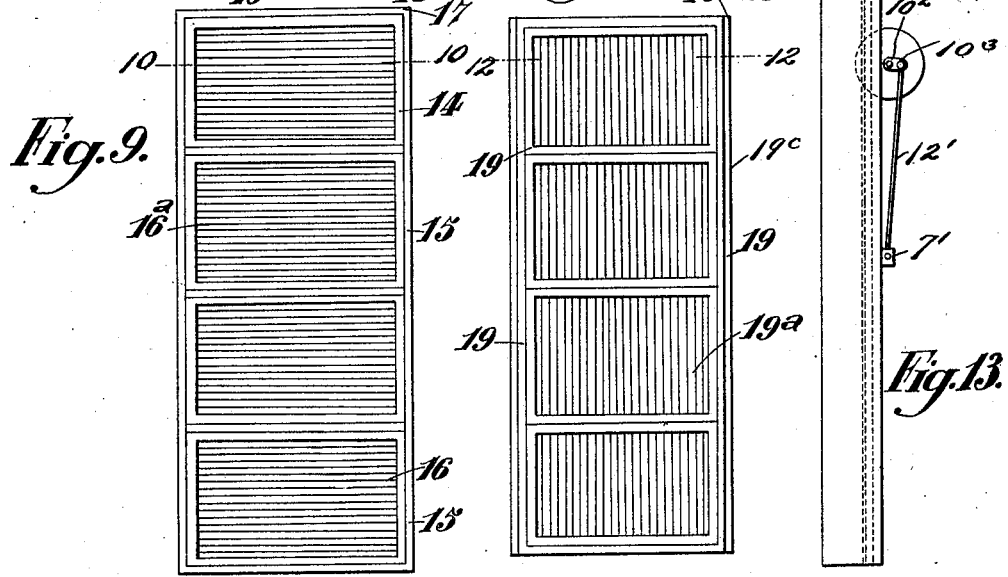
Fig. 9 is a plan view of another modified form of sieve.
Fig. 13 is a side view of the sieve shown in Figs. 9 to 12 showing the driving means for the lower frame.

A suitable driving means for the frame 18 is shown in Fig. 13. This may comprise a shaft 10², a crank 10³ carried by said shaft, and a pitman 12′ connecting said crank to a cross-head 7′ secured to the frame 18.

A further form of sieve embodying the invention is shown in Figs. 14 to 17. This comprises a stationary frame 20 having wires 21 extending longitudinally thereof with their opposite ends secured to the ends of the frame and a frame 22 having tongues extending longitudinally of its side members which slide in grooves extending longitudinally of the inner sides of the side members of the frame 20 in order that the frame 22 may move longitudinally of the frame 20. The frame 22 carries transverse cross bars 23 having in their upper sides or edges as many notches 22ª as there are wires in the frame 20 to receive said wires.

Having now particularly described my said invention, what I claim is:

1. A unitary sieve comprising two grid elements one of which is reciprocatingly movable relatively to the other, each element being provided with elongated parallel openings, said elements being arranged across each other in relatively close relation with said openings at an angle to each other, whereby said openings coact to provide meshes and means to reciprocate the movable element wholly in a plane close to and parallel with that of the other element.

2. A unitary sieve comprising a frame member having parts therein in parallel relation providing openings therebetween, a grid member having parts in parallel relation providing openings therebetween and arranged relatively close to and across the first parts whereby the openings of the two members will coact to provide meshes, the frame member being reciprocatingly movable in a path at a right angle to the grid member and means for reciprocating the frame member wholly in a plane close to and parallel with that of the grid member.

3. A unitary sieve comprising a frame member having parts therein in parallel relation providing openings therebetween, a grid member having parts in parallel relation providing openings therebetween and arranged relatively close to and across the first parts whereby the openings of the two members will coact to provide meshes, said members being in tongue and grooved relation and one member being reciprocatingly movable in a path at an angle to the other, and wholly in a plane close to and parallel with that of the other member.

4. A unitary sieve comprising a frame member having parallel wires therein providing openings therebetween, a reciprocatory member slidably mounted within the frame member, said reciprocatory member having parts in parallel relation providing openings therebetween and arranged relatively close to and at a right angle to the wires of said frame member, whereby the openings of the two members will coact to provide meshes, and means for reciprocating said reciprocatory member wholly in a plane close to and parallel with that of the frame member.

5. A unitary sieve comprising a frame member having parts therein in parallel relation providing openings therebetween, and a grid member having parts in parallel relation providing openings therebetween and arranged relatively close to and across the parts of said frame member whereby the openings of the two members will coact to provide meshes, one of the members being movable in a path at a right angle to the other member and wholly in a plane close to and parallel with that of the other member, the parts of the different members being in interdigitating relation.

6. A unitary sieve comprising a grid element having parallel openings each of the same width and, another grid element having parallel openings each of the same width, said elements being arranged across each other relatively close together and reciprocally movable one with respect to the other wholly in planes close to and parallel with one another, whereby said openings coact to provide equal sized meshes.

7. A unitary sieve comprising a frame having side and end walls, a plurality of rods extending parallel to the side walls, and mounted in the end walls thereof, a reciprocatory frame mounted in the first frame and provided with a plurality of cross bars having grooves to receive the rods of the first frame with the projecting portions of said cross bars fitting snugly in the spaces between the rods thus forming open meshes between the rods and cross bars, and means for reciprocating the second frame wholly in a plane close to and parallel with that of the first frame.

JAKOB PETER.